(12) United States Patent
Stenfelt et al.

(10) Patent No.: US 8,797,859 B2
(45) Date of Patent: Aug. 5, 2014

(54) RESET FUNCTIONS

(75) Inventors: John Stenfelt, Gothenburg (SE); Hans Mattsson, Bollebygd (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 78 days.

(21) Appl. No.: 13/509,386

(22) PCT Filed: Nov. 13, 2009

(86) PCT No.: PCT/EP2009/008084
§ 371 (c)(1),
(2), (4) Date: May 11, 2012

(87) PCT Pub. No.: WO2011/057651
PCT Pub. Date: May 19, 2011

(65) Prior Publication Data
US 2012/0224538 A1     Sep. 6, 2012

(51) Int. Cl.
*H04L 1/00* (2006.01)
*H04L 12/14* (2006.01)
*H04L 12/26* (2006.01)

(52) U.S. Cl.
CPC ............. *H04L 12/1407* (2013.01); *H04L 12/14* (2013.01); *H04L 43/026* (2013.01)
USPC ........................................................ 370/230

(58) Field of Classification Search
None
See application file for complete search history.

(56) References Cited

U.S. PATENT DOCUMENTS

| | | | |
|---|---|---|---|
| 8,331,229 B1* | 12/2012 | Hu et al. ...................... | 370/230 |
| 2009/0141625 A1* | 6/2009 | Ghai et al. ................... | 370/230 |
| 2009/0156213 A1* | 6/2009 | Spinelli et al. ............... | 455/436 |
| 2012/0117220 A1* | 5/2012 | Mariblanca Nieves ....... | 709/223 |

OTHER PUBLICATIONS

3GPP, "3rd Generation Partnership Project; Technical Specification Group Services and System Aspects; Policy and Charging Control Architecture (Release 9)", 3GPP TS 23.203 V9.2.0, Sep. 2009, 119 pages.
3GPP, "3rd Generation Partnership Project; Technical Specification Group Core Network and Terminals; Policy and Charging Control over Gx Reference Point (Release 9)", 3GPP TS 29.212 V9.0.0, Sep. 2009, 92 pages.

* cited by examiner

*Primary Examiner* — Phuc Tran
(74) *Attorney, Agent, or Firm* — Rothwell, Figg, Ernst & Manbeck, P.C.

(57) ABSTRACT

The invention discloses a node (120) for use in a wireless access communications system (100) which is arranged to transmit information to and receive information from a PCRF (110), a Policy and Charging Rules Function, in the system. The information to and from the PCRF (110) is transmitted over a Gx interface, and the node is also arranged to count the amount of a defined service in the system which is used by a user, a UE (130) in the system during a defined period of time and to take a defined course of action when said amount of the defined service reaches a threshold value. The node (120) is arranged to be able to reset said count at a defined point in time, a "reset point", and the information which the node it is arranged to receive from the PCRF (110) comprises information on said reset point.

25 Claims, 4 Drawing Sheets

RESET FUNCTIONS

CROSS REFERENCE TO RELATED APPLICATION(S)

This application is a 35 U.S.C. §371 National Phase Entry Application from PCT/EP2009/008084, filed Nov. 13, 2009, designating the United States, the disclosure of which is incorporated by reference herein in its entirety.

TECHNICAL FIELD

The present invention discloses nodes and an interface for an improved reset function in wireless access communications system.

BACKGROUND

Recent developments in 3GPP, Third Generation Partnership Project, have introduced enhancements of the functionality for Policy and Charging Control, PCC, for the Evolved Packet System, EPS, to also include volume reporting over the so called Gx interface. This feature is commonly known as Usage Monitoring Control, and the volume referred to could for example be a user's used volume of a certain service or an aggregate of services, measured in, for example, kilobytes, A fundamental idea behind the Usage Monitoring Control is to provide operators of a system with a tool to monitor and limit bandwidth consumption for users such as, for example, mobile broadband users, on a per user and service basis in order to be able to detect abnormal usage, e.g. so called "bandwidth hogs", and to also be able to e.g. police the bandwidth after a certain volume limit has been reached by a user. This kind of functionality already exists in some systems for mobile broadband subscription, e.g. traffic is free of charge up to a certain traffic volume per month, following which the user either has to pay an additional fee, or the bandwidth is policed down to a low bit-rate.

In an EPS system, there is a node or function known as the PCRF, Policy and Charging Rules Function, and another node or function known as the PCEF, Policy and Charging Enforcement Function. The PCRF and the PCEF communicate with each other over an interface known as the Gx interface.

The allowed usage, or a "threshold" for allowed usage, is stored in a database that is accessible by the PCRF. When a PDN connection is established to a certain APN, Access Point Name, the user's allowed usage or "threshold" is retrieved from the database by the PCRF at the session establishment, also known as the Gx session establishment. The allowed usage is then provided to the PCEF, Policy and Charging Enforcement Function, usually per so called Monitoring Key. This will then prompt the PCEF to activate usage monitoring for the active PCC rules associated with the Monitoring Key. If a threshold is reached, the PCEF will report this to the PCRF, which may take appropriate action e.g. downgrade the QoS, Quality of Service, or de-activate a certain PCC-rule. The PCRF can also request a usage report from a PCEF for a user prior to a threshold being reached, and can also provide a new threshold value for a user (e.g. for a certain service) to the PCEF.

Document 3GPP TS 23.203 V9.2.0 (2009-09) Technical Specification 3rd Generation Partnership Project; Technical Specification Group Services and System Aspects, Policy and charging control architecture (Release 9) teaches usage monitoring for the accumulated usage of network resources on a per IP-CAN session and user basis, as well as a PCRF that sets and send applicable thresholds to a PCEF for monitoring, and a PCEF that notifies the PCRF when a usage monitoring threshold is reached, and reports the accumulated usage since the last report for usage.

SUMMARY

It is an object of the present invention to provide an improvement in the usage reports between nodes such as the PCEF and the PCRF in a system such as for example the EPS.

Such an improvement is offered by the present invention in that it discloses a node for use in a wireless access communications system which is arranged to transmit information to and receive information from a PCRF, a Policy and Charging Rules Function, in the system.

The information to and from the PCRF is transmitted over a Gx interface, and the node of the invention is also arranged to count the amount of a defined service in the system which is used by a user, a UE, in the system during a defined period of time and to also take a defined course of action when the amount of the defined service reaches a threshold value.

The inventive node is arranged to be able to reset said count to zero at a defined point in time, a "reset point", and the information which the inventive node it is arranged to receive from the PCRF comprises information on said reset point.

Thus, by means of the invention, a node such as a PCEF in a system such as an EPS system can be instructed in advance by the PCRF over the Gx interface as to when the PCEF should reset its counter, and this instruction can be provided by the PCRF to the PCEF at a point in time when this is convenient for both the PCEF and the PCRF, and can then be stored by the PCEF, to be acted upon at the instructed point in time, i.e. the reset point.

In one embodiment, the node of the invention is also arranged to receive information from the PCRF regarding a new threshold value, in which case the node is also arranged to change the threshold value if such information is received from the PCRF. Thus, in this embodiment, the PCRF can instruct the node of an increase or decrease in a user's threshold or "quota".

In one embodiment, the node of the invention is arranged to apply a changed threshold value from the reset point.

The invention also discloses a second node for use in a wireless communications system which is arranged to transmit information and instructions to and receive information from a PCEF, a Policy and Charging Enforcement Function, in the system. The information to and from the PCEF is transmitted over a Gx interlace, and the second node of the invention is arranged to let the instructions to the PCEF include information on a point in time, a "reset point", at which the PCEF should reset a counter regarding the amount of a defined service in the system which is used by a user, a UE in the system during a defined period of time.

In one embodiment, the second node is also arranged to transmit instructions to the PCEF regarding a threshold value for said counter.

In one embodiment, the second node is being arranged to instruct the PCEF to let said threshold value replace an existing threshold value in the PCEF.

The invention also discloses a Gx interlace for use in a wireless communications system for communication between a Policy and Charging Rules Function node, a PCRF node, and a Policy and Charging Enforcement node, a PCEF node in the system. The interlace of the invention is arranged to let the PCRF transmit instructions to the PCEF regarding a point in time, a "reset point", at which the PCEF should reset a counter regarding the amount of a defined service in the system which is used by a user, a UE, in the system during a defined period of time.

In one embodiment, the Gx interface of the invention is also arranged to let the PCRF transmit instructions to the PCEF regarding a threshold value for said counter. In one such embodiment, the Gx interlace is also arranged to let the PCEF transmit information to the PCRF that said threshold value has been reached by said counter.

BRIEF DESCRIPTION OF THE DRAWINGS

The invention will be described in more detail in the following, with reference to the appended drawings, in which.

DETAILED DESCRIPTION

Figure 1:
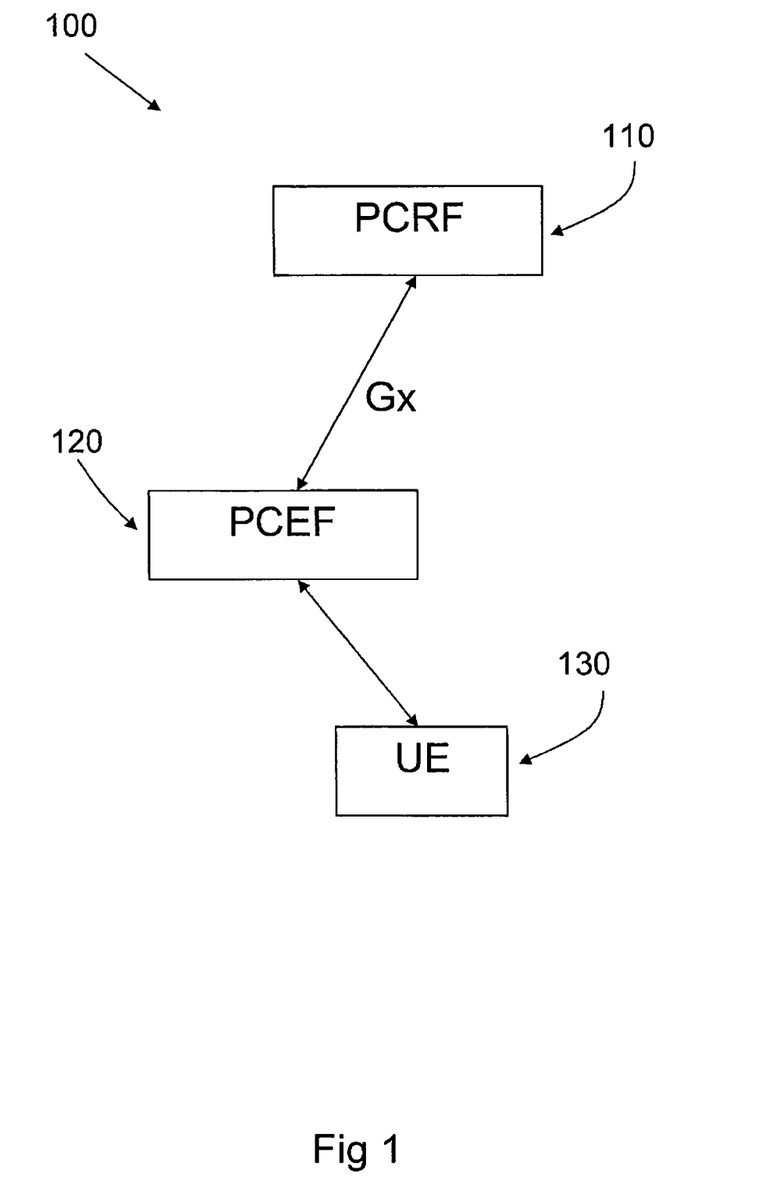
FIG. 1 shows an example of a system in which the invention is applied.

FIG. 1 shows a very schematic view of a part of an Evolved Packet System, an EPS system, 100 in which the invention is applied.

The system 100 can accommodate a number of users, UEs, one of which is shown as 130 in FIG. 1. In addition, the system 100 also comprises a node or function 120 known as a PCEF, Policy and Charging Enforcement Function, which can either be located in a so called GGSN, a Gateway GPRS Support Node, or which can, alternatively, be implemented as a "stand alone" node. In addition, the PCEF 120 can also be located in a so called PDN-GW, a Packet Data Network Gateway As implied by the name, one function performed by the PCEF 120 is to allow or deny a user such as the UE 130 access to services within or outside of the system 100. Usually, the PCEF 130 gains knowledge of a user's rights and the services to which the user should have access by means of another function or node in the system, known as the PCRF 110, Policy and Charging Rules Function. Such information is usually sent from the PCRF 110 to the PCEF 120 when a user initiates a session, the information being sent over the interface between the PCRF and the PCEF, the so called Gx interface.

The information sent between the PCRF and the PCEF over the Gx interface can also include such information as a user's allowed quota or threshold for a certain service, which can for example be expressed as the amount of data used in a particular service, i.e. kilobytes, Gigabytes, etc. The PCEF receives a user's threshold from the PCRF, and then keeps count of the user's usage and takes a specified course of action when the user reaches the threshold such as notifying the PCRF, or reducing or cutting off the user from the service in question. The action to be taken is preferably specified by the PCRF to the PCEF.

A user's threshold or quota will usually be specified for a certain amount of time, e.g. per month, week, day etc. This leads to a need for the PCEF to reset (usually to zero) its count for a user's usage of a service. In addition, the PCRF may need to change a user's threshold (quota) from one value to another, i.e. to either increase or decrease the user's threshold, in addition to which the PCRF may need to request the PCEF to transmit a usage report on a user's current count of use for a certain service even at points in time when the threshold has not been reached. The reset function as well as possibly one or more of the other of the functions mentioned (change of threshold, usage report) are handled by the present invention, as the following examples of embodiments will illustrate. As will become apparent form these example, the invention discloses improved nodes or functions such as the PCEF and the PCRF, as well as an improved Gx interface.

Figure 2:
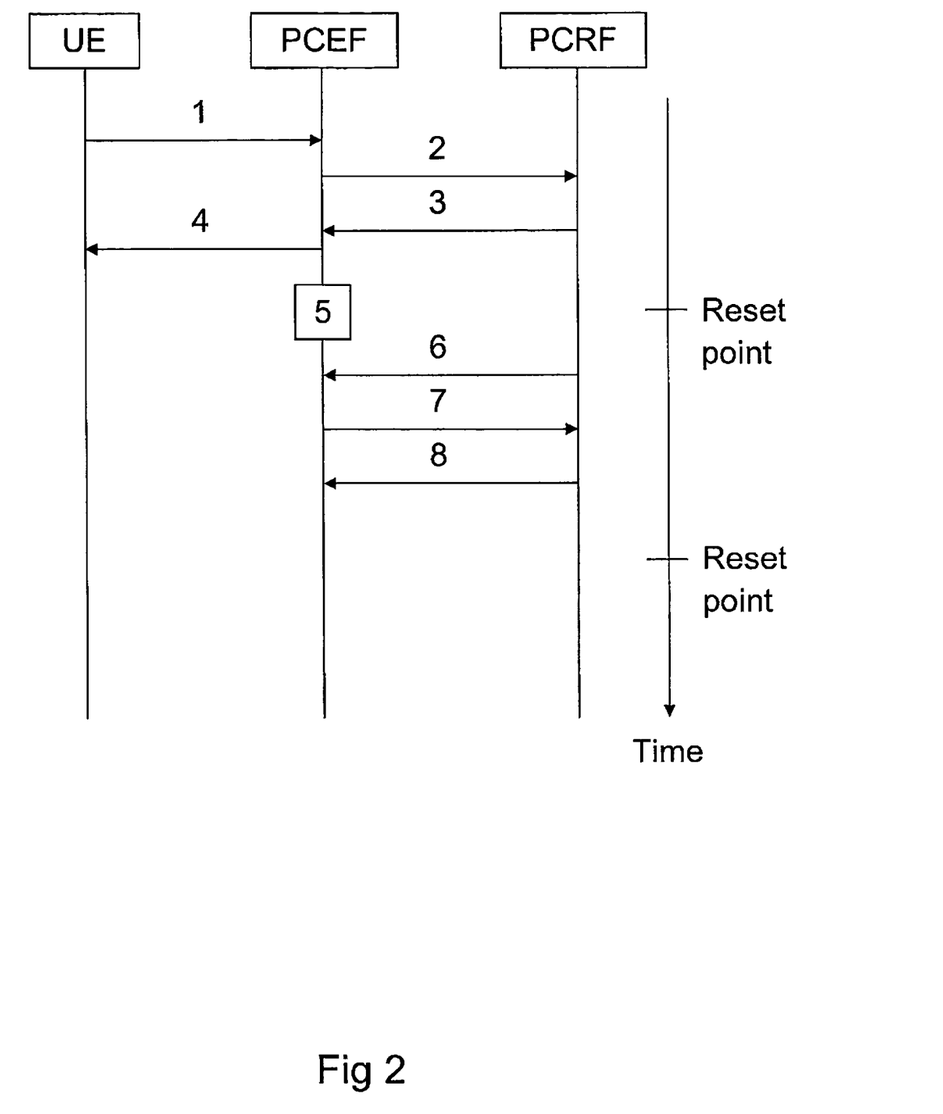
FIGS. 2-4 show examples of embodiments of the invention.

A first example of an embodiment of the present invention will now be described with reference to the time line shown in FIG. 2. FIG. 2 shows the interaction between an UE, the corresponding PCEF and the PCRF in this embodiment.

In the embodiment illustrated in FIG. 2, the PCRF provides both a reset time and a reset usage threshold in addition to the existing information for Usage Monitoring Control to the PCEF. The reset usage threshold is intended to replace the existing threshold in the PCEF. When the reset is performed in the PCEF, no signaling over the Gx interface is required, since the PCEF has already been "programmed" with the point in time when the reset should be performed, i.e. the "reset point".

In the embodiment shown in FIG. 2, the PCRF initiates the provisioning of the updated information to the PCEF, which allows the PCRF to schedule the updates over time in a way that is suitable for the PCRF. This will, for example, enable the PCRF to spread out the provisioning of such information to a number of PCEFs in the system over time, thereby reducing the risk of congestion in the system.

In the embodiment shown in FIG. 2, when the PCEF reports a UEs usage to the PCRF, this is done only for the time after the reset time. Such an embodiment would for example be applicable for the case of a periodic reset (i.e. the same usage is allowed for each period) when the operator is not interested in knowing the accumulated usage below a UEs usage threshold prior to the reset point.

The details of the embodiment shown in FIG. 2 are as follows, with reference to the numbers in FIG. 2, the time aspect being illustrated by means of a vertical axis labeled "time":

1. A UE requests activation of a connection to a wireless communications system, e.g. an EPS, that is subject to dynamic policy control.

2. The request triggers the appropriate PCEF (e.g. the PDN-GW for EPS and the GGSN for GPRS) to establish a new Gx session towards the PCRF.

3. The PCRF accepts the new session, and provides policy decisions in a response to the PCEF. If Usage Monitoring Control is deployed then Monitoring Key(s) and allowed usage (threshold/quote) per Monitoring Key is provided.

4. The PCEF grants the requested access to the UE. From this point in time, a user plane is considered to be established and payload may flow to/from the UE.

5. At the reset point, the PCEF reset its usage counter (s) and also applies the new reset usage threshold. No signaling with the PCRF is needed at this point in time.

6. After the reset point has occurred, but prior to the next reset point (the next reset point also being shown in FIG. 2), the PCRF requests a usage report.

7. The PCEF reports the current state of the applicable usage counters to the PCRF.

8. The PCRF subtracts the reported usage from the totally allowed usage per applicable period (e.g. one month), and then provides new threshold values in the response to the PCEF. The new threshold corresponds to the allowed usage which the user has left for the period in question, e.g. the month mentioned previously.

A second example of an embodiment of the invention will now be described with reference to FIG. 3 and the reference numbers of FIG. 3. In this embodiment, the PCRF provides both a reset point in time and a reset usage threshold in addition to the existing information for Usage Monitoring Control to the PCEF. Thus, when the reset occurs, no signaling over the Gx interface is required.

Figure 3:
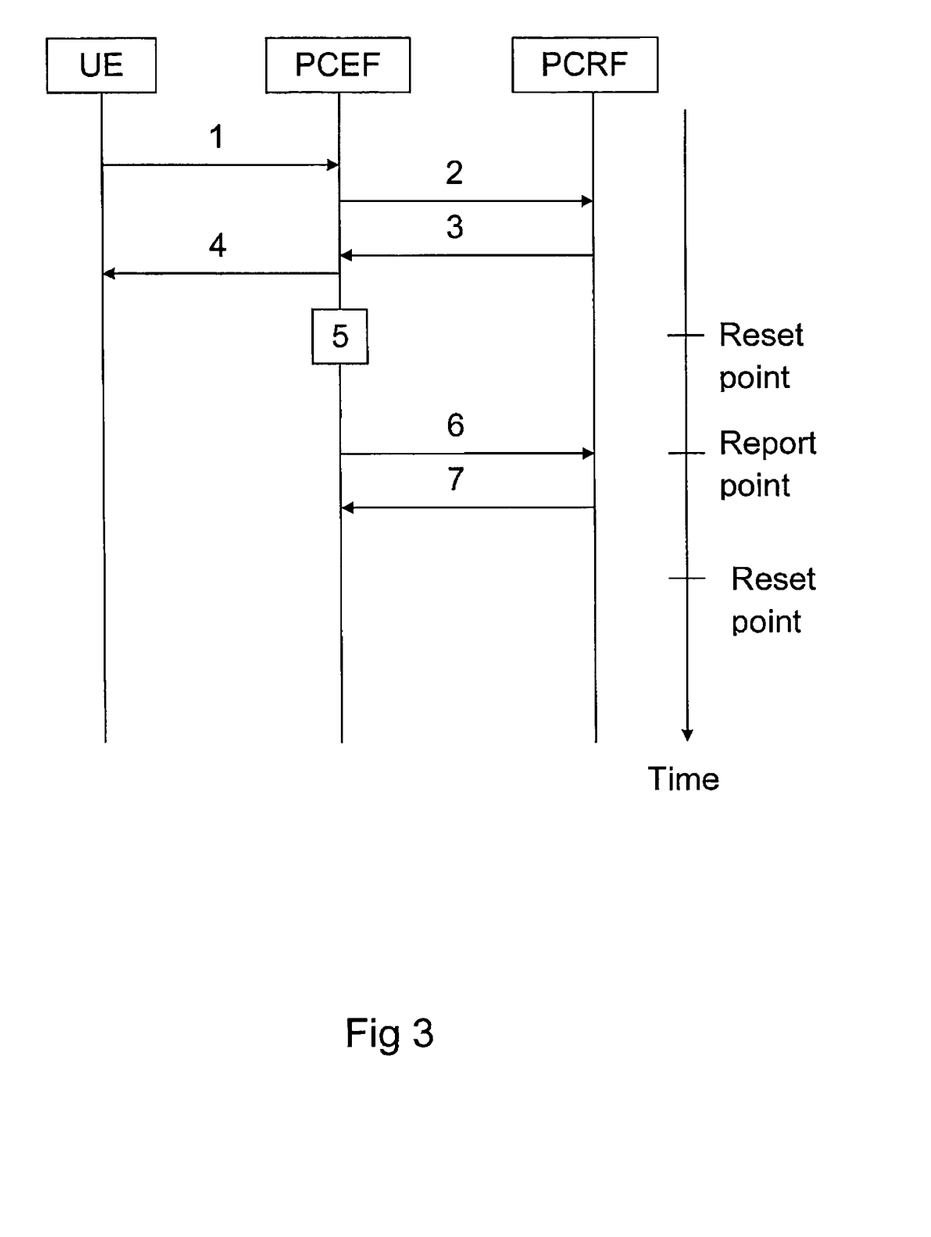

In the embodiment of FIG. 3, the PCRF provides a time limit to the PCEF for when the PCEF is expected to report usage. For example, the already existing so called Revalidation time limit that exists on session level could be used for this as well, i.e. to schedule a usage report. However a new Monitoring Key specific time limit parameter could also be imaginable. In this way, updates may be scheduled over time in a way and at a pace that is suitable for the PCEF. The updates which are referred to here are such updates as, for example, updates of policy rules and also new activation and deactivation times for those rules, which thus makes it possible to alter, for example, access rights, bandwidth limitations, and charging aspects for a certain IP based service.

When the PCEF transmits the usage report to the PCRF, this is done separately for the time before and after the reset point. This embodiment would for example be applicable for the case of a periodic reset (i.e. the same usage is allowed for each period) when the operator of the system is interested in knowing the usage below threshold prior to the reset time for reasons of e.g. statistics.

With reference to the time-line in FIG. 3 and the reference numbers therein, the following occurs in the embodiment of FIG. 3, the time aspect being illustrated by means of a vertical axis labeled "time":

1. A UE requests activation of a connection to a wireless communications system, e.g. an EPS, that is subject to dynamic policy control.

2. The request from the UE triggers the appropriate PCEF (i.e. the PDN-GW for EPS and the GGSN for GPRS) to establish a new Gx session towards the PCRF.

3. The PCRF accepts the new session and provides policy decisions in a response to the PCEF. If Usage Monitoring Control is deployed then Monitoring Key(s) and allowed usage per Monitoring Key is provided. In addition, for each active Monitoring Key, a reset point is provided as well as a reset usage threshold. In addition, a report point in time (for example the revalidation time limit) is provided (either on session level or on Monitoring Key level) for when the PCEF should transmit a usage report to the PCRF.

4. The GW/PCEF grants the requested access. From this point in time, a user plane is considered to be established and payload may flow to/from the UE.

5. At the reset point, the PCEF stores the current status of the usage counters, resets the counters, and applies the new reset usage threshold. No signaling with the PCRF over the Gx interface is needed.

6. When the report timer expires, the PCEF reports both the stored usage prior to the reset time and the current state of the applicable usage counters to the PCRF.

7. The PCRF subtracts the reported usage (after the reset point) from the totally allowed usage per reporting period (e.g. one month, one week, etc) and then provides new threshold values to the PCEF. In addition, a new reset time and reset usage threshold is provided for the applicable Monitoring Keys. In addition, a new report point time is also provided to the PCEF.

Figure 4:
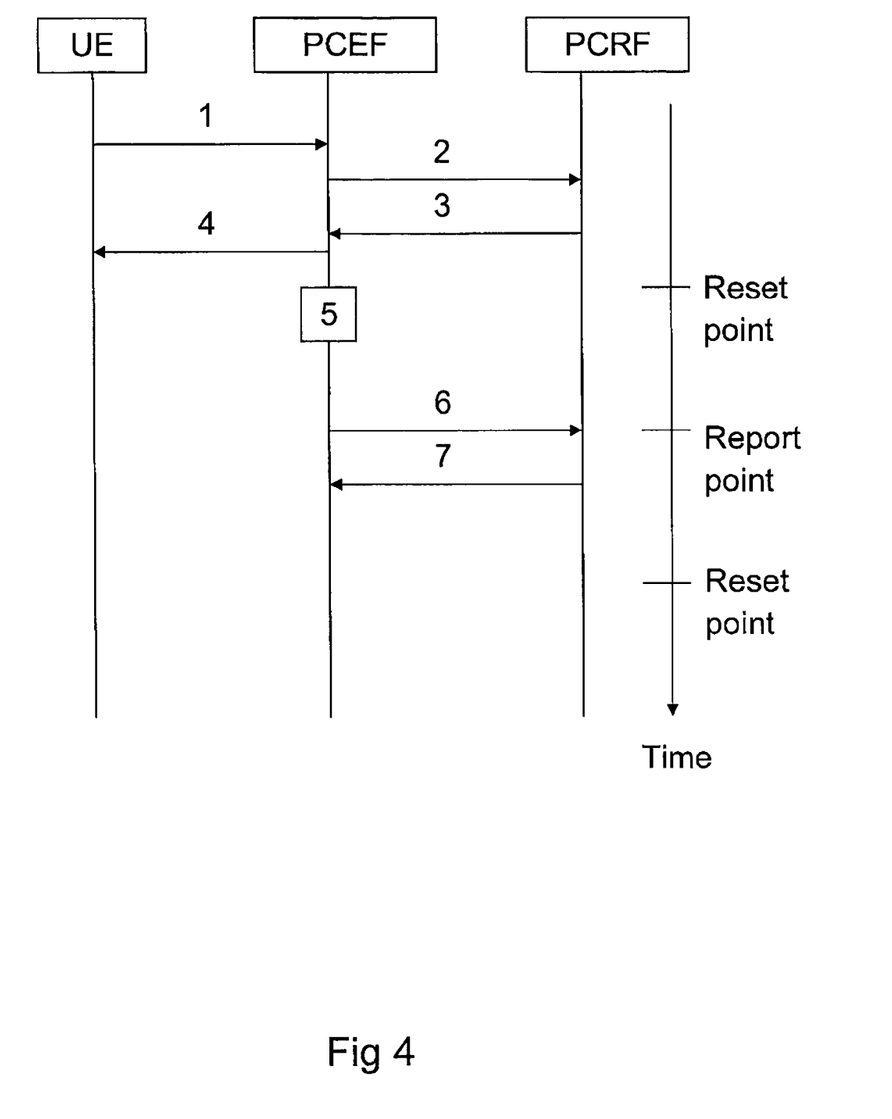

A third example of an embodiment of the present invention will now be described with reference to FIG. 4 and with reference to the time line and the reference numbers shown in FIG. 4. FIG. 4 shows the interaction between an UE, the corresponding PCEF and the PCRF in this embodiment.

In the embodiment of FIG. 4, the PCRF provides only a reset time in addition to the existing information for Usage Monitoring Control to the PCEF. When the reset occurs, no signaling over Gx is required for this, this reducing the risk of congestion over the Gx interface.

In the embodiment of FIG. 4, the PCRF provides a time limit to the PCEF for when the PCEF is expected to report usage. In other words, the PCEF can "spread out" its reporting over an interval of time up to, and possibly including the time limit, which gives the PCEF a possibility to spread its work load over time. For example, the already existing Revalidation time limit that exists on session level could be re-used for this. However, a new Monitoring Key specific time limit parameter could also be envisioned. In this way, updates may be scheduled (distributed) over time in a way and at a pace that is suitable for the PCEF.

When the PCEF transmits a usage report, this is done separately for the time before and after the reset point. This embodiment would e.g. be applicable for the case of a periodic reset (i.e. the same usage is allowed for each period) when the operator of the system is interested in knowing the usage below the threshold prior to the reset time, e.g. for statistical reasons.

With reference to the time-line in FIG. 4 and the reference numbers therein, the following occurs in the embodiment of FIG. 4, the time aspect being illustrated by means of a vertical axis labeled "time":

1. A UE requests activation of a connection to a wireless communications system such as e.g. an EPS that is subject to dynamic policy control.

2. The request form the UE triggers the PCEF (i.e. the PDN-GW for EPS and the GGSN for GPRS) to establish a new Gx session towards the PCRF.

3. The PCRF accepts the new session and provides policy decisions in a response to the PCEF. If Usage Monitoring Control is deployed, then Monitoring Key(s) and allowed usage per Monitoring Key is provided. In addition, for each active Monitoring Key a reset point in time is also provided. In addition, a report point in time (such as, for example, the revalidation time limit) is provided (either on session level or on Monitoring Key level) for when the PCEF should transmit a usage report.

4. The GW/PCEF grants the requested access. From this point in time, a user plane is considered to be established and payload may flow from/to the UE.

5. At the reset point in time, the PCEF stores the current status of the usage counters, resets its counters and applies the remaining allowed usage (i.e. the difference between the allowed usage and the consumed usage) as the new threshold. No signaling with the PCRF is thus needed over the Gx interface for this, thereby reducing the risk of congestion over the Gx interface.

6. When a report is triggered, either because the report timer expires or by any other reason, the PCEF reports both the stored usage prior to the reset time and the current state of the applicable usage counters to the PCRF.

7. The PCRF subtracts the reported usage (after the reset point in time) from the totally allowed usage per reporting period (e.g. one month, one week, etc) and then provides new threshold values in a response to the PCEF. In addition, a new reset time and reset usage threshold is provided for the applicable Monitoring Keys. A new report point in time is provided to the PCEF.

The invention is not limited to the examples of embodiments described above and shown in the drawings, but may be freely varied within the scope of the appended claims.

The invention claimed is:

1. A Policy and Charging Enforcement Function (PCEF) node for use in a wireless access communications system in which Usage Monitoring Control is used, the PCEF node comprising:
   a processor and a memory, said memory containing instructions executable by said processor whereby said PCEF node is operative to:
   transmit information to and receive information from a Policy and Charging Rules Function (PCRF) node in the system, the information to and from the PCRF node being transmittable over an interface, wherein the received information that the PCEF node is configured to receive includes:
   (1) one or more Monitoring Keys for a user (UE) in the system,
   (2) an allowed usage threshold per Monitoring Key for the UE,
   (3) a reset point corresponding to a point in time at which the PCEF node resets a counter regarding an amount of a defined service in the system used by the UE during a defined period of time, and
   (4) a reporting point for the PCEF node to transmit reports to the PCRF node regarding the amount of the defined service in the system used by the UE during the defined period of time, wherein the information regarding the reporting point is transmitted before the reset point, and wherein the reporting point is after the reset point;
   count the amount of the defined service in the system which is used by the UE during the defined period of time per Monitoring Key;
   take a defined course of action when the amount of the defined service used by the UE reaches the allowed usage threshold;
   reset the count to zero for each Monitoring Key at the reset point; and
   transmit the reports to the PCRF node at the reporting point.

2. The PCEF node of claim 1, further configured to receive information from the PCRF node regarding a new allowed usage threshold value, and to change the threshold value if such information is received from the PCRF node.

3. The PCEF node of claim 2, further configured to apply a changed threshold value from the reset point based on the new allowed usage threshold.

4. The PCEF node of claim 1, further configured to receive instructions from the PCRF node to transmit the reports to the PCRF node regarding a UE's usage up to the reset point, and to carry out such instructions.

5. The PCEF node of claim 4, further configured to receive instructions from the PCRF node to transmit the reports to the PCRF node regarding a UE's usage up to the reset point and between a reset point and the next reporting point, and to carry out such instructions.

6. The PCEF node of claim 1, further configured to receive instructions from the PCRF node to transmit the reports to the PCRF node regarding a UE's usage between a reset point and the next reporting point, and to carry out such instructions.

7. The PCEF node of claim 1, wherein the PCEF node is a node in an Evolved Packet System (EPS), in a Packet Data Network Gateway (PDN-GW), in the EPS system.

8. The PCEF node of claim 1, wherein the PCEF node is a node in a General Packet Radio Services system (GPRS), in a Gateway GPRS Support Node (GGSN), in the GPRS system.

9. The PCEF node of claim 1, wherein the PCEF node is further configured to transmit the information to and receive the information from the PCRF node over a Gx interface.

10. The PCEF node of claim 1, wherein the PCEF node is further configured to receive instructions from the PCRF node regarding when the PCEF node should transmit the reports to the PCRF node.

11. The PCEF node of claim 1, wherein the reporting point is in the form of a time limit interval, and wherein the PCEF node is further configured to spread out reporting over the interval.

12. A Policy and Charging Rules Function (PCRF) node for use in a wireless communications system in which Usage Monitoring Control is used, the PCRF node comprising:
   a processor and a memory, said memory containing instruction executable by said processor whereby said PCRF node is operative to:
   transmit information to and receive information from a Policy and Charging Enforcement Function (PCEF), node in the system, the information being transmitted over an interface,
   wherein the information which the PCRF node is configured to transmit to the PCEF node includes:
   (1) one or more Monitoring Key for a user (UE) in the system,
   (2) allowed usage per Monitoring Key for a UE, and
   (3) a reset point corresponding to a point in time at which the PCEF node resets to zero a counter regarding the amount of a defined service in the system during a defined period of time for each Monitoring Key for the UE, and
   (4) a reporting point for the PCEF node to transmit reports to the PCRF node regarding the amount of the defined service in the system used by the UE during the defined period of time, wherein the information regarding the reporting point is transmitted before the reset point, and wherein the reporting point is after the reset point,
   wherein the PCRF node is configured to receive the reports from the PCEF node.

13. The PCRF node of claim 12, wherein the PCRF node is further configured to transmit information to the PCEF node regarding a new allowed usage threshold value for the counter.

14. The PCRF node of claim 13, wherein the PCRF node is further configured to instruct the PCEF node to replace an existing allowed usage threshold value in the PCEF node with the new allowed usage threshold value.

15. The PCRF node of claim 12, wherein the PCRF node is a node in an Evolved Packet System (EPS).

16. The PCRF node of claim 12, wherein the PCRF node is a node in a General Packet Radio Services (GPRS) system.

17. The PCRF node of claim 12, wherein the PCRF node is configured to transmit the information to and receive the information from the PCEF node over a Gx interface.

18. The PCRF node of claim 12, wherein the PCRF node is further configured to transmit different reporting points to different PCEF nodes so as to spread out the transmission of the reports by the PCEF nodes in order to reduce the risk of congestion in the system.

19. The PCRF node of claim 12, wherein the reporting point is in the form of a time limit interval.

20. A method for use in a wireless communications system in which Usage Monitoring Control is used, for communication between a Policy and Charging Rules Function (PCRF) node and a Policy and Charging Enforcement (PCEF) node in the system, the method comprising:
   transmitting information from the PCRF node to the PCEF node, the information including:
   (1) one or more Monitoring Keys for a user (UE) in the system, (2) an allowed usage threshold per Monitoring Key for the UE, (3) a reset point corresponding to a point in time at which the PCEF node resets a counter regarding the amount of a defined service in the system used by the UE during a defined period of time, and (4) a reporting point for the PCEF node to transmit reports to the PCRF node regarding the amount of the defined service in the system used by the UE during the defined period of time, wherein the information regarding the reporting point is transmitted before the reset point, and wherein the reporting point is after the reset point and receiving the reports from the PCEF node.

21. The method of claim 20, wherein the information includes information regarding a threshold value for the counter.

22. The method of claim 20, comprising:
transmitting information from the PCEF node to the PCRF node indicating whether the threshold value has been reached by the counter.

23. The method of claim 20, wherein the information transmitted to and received from the PCEF node is transmitted over a Gx interface.

24. The method of claim 20, wherein the PCRF node transmits different reporting points to different PCEF nodes so as to spread out the transmission of the reports by the PCEF nodes in order to reduce the risk of congestion in the system.

25. The PCRF node of claim 20, wherein the reporting point is in the form of a time limit interval.

* * * * *

UNITED STATES PATENT AND TRADEMARK OFFICE
CERTIFICATE OF CORRECTION

PATENT NO.        : 8,797,859 B2                                         Page 1 of 1
APPLICATION NO.   : 13/509386
DATED             : August 5, 2014
INVENTOR(S)       : Stenfelt et al.

It is certified that error appears in the above-identified patent and that said Letters Patent is hereby corrected as shown below:

In the Specification

In Column 2, Line 49, delete "interlace," and insert -- interface, --, therefor.

In Column 2, Line 61, delete "interlace" and insert -- interface --, therefor.

In Column 2, Line 65, delete "interlace" and insert -- interface --, therefor.

In Column 3, Line 7, delete "interlace" and insert -- interface --, therefor.

In Column 3, Line 37, delete "PCEF 130" and insert -- PCEF 120 --, therefor.

In the Claims

In Column 9, Line 13, in Claim 20, delete "point and" and insert -- point; and --, therefor.

Signed and Sealed this
Second Day of June, 2015

Michelle K. Lee
*Director of the United States Patent and Trademark Office*